US011591246B2

United States Patent
Yamamoto et al.

(10) Patent No.: US 11,591,246 B2
(45) Date of Patent: Feb. 28, 2023

(54) ORGANIC SLUDGE TREATMENT DEVICE AND TREATMENT METHOD

(71) Applicants: TAIHEIYO ENGINEERING CORPORATION, Tokyo (JP); TAIHEIYO CEMENT CORPORATION, Tokyo (JP)

(72) Inventors: Yasushi Yamamoto, Tokyo (JP); Takayuki Kimura, Chiba (JP); Kouji Kamada, Chiba (JP); Kazushi Izumi, Chiba (JP); Naoki Ueno, Chiba (JP)

(73) Assignees: TAIHEIYO ENGINEERING CORPORATION, Tokyo (JP); TAIHEIA AEMENT CORPORATION, Tokyo (JP)

(*) Notice: Subject to any disclaimer, the term of this patent is extended or adjusted under 35 U.S.C. 154(b) by 77 days.

(21) Appl. No.: 16/982,894

(22) PCT Filed: Apr. 4, 2018

(86) PCT No.: PCT/JP2018/014386
§ 371 (c)(1),
(2) Date: Sep. 21, 2020

(87) PCT Pub. No.: WO2019/193671
PCT Pub. Date: Oct. 10, 2019

(65) Prior Publication Data
US 2021/0009455 A1    Jan. 14, 2021

(51) Int. Cl.
*C02F 11/06* (2006.01)
*C02F 11/13* (2019.01)
(Continued)

(52) U.S. Cl.
CPC ............. *C02F 11/06* (2013.01); *C02F 11/00* (2013.01); *C02F 11/13* (2019.01); *C04B 7/40* (2013.01);
(Continued)

(58) Field of Classification Search
CPC .......... C02F 11/06; C02F 11/00; C02F 11/13; C02F 2303/02; C02F 2303/10;
(Continued)

(56) References Cited

U.S. PATENT DOCUMENTS 5,614,016 A * 3/1997 Hundebol ................. C04B 7/40
432/106

FOREIGN PATENT DOCUMENTS

CN         104315523 A      1/2015
ES         2403370 T3  *    5/2013
(Continued)

OTHER PUBLICATIONS

Search Report for PCT/JP2018/014386.
Search Report for PCT/JP2019/010030, dated Apr. 2019.

*Primary Examiner* — Fred Prince
(74) *Attorney, Agent, or Firm* — Stetina Brunda Garred & Brucker

(57) ABSTRACT

To treat organic sludge while keeping facility costs, cement production efficiency, and a reduction in clinker production amount to a minimum. An organic sludge treatment device includes: a fractionation device 7 that fractionates a preheated raw material R2 from a preheater cyclone 4C excluding a bottommost cyclone of a cement burning device 1; a mixing device 8 that mixes an organic sludge S with the fractionated preheated raw material, and that dries the organic sludge using sensible heat of the preheated raw material; and a supply device (mixture chute 12, double-flap damper 13, shut damper 14) that supplies a mixture M from
(Continued)

the mixing device to a calciner furnace 5 of the cement burning device or to a duct disposed between a kiln inlet portion of a cement kiln 2 and the calciner furnace. The treatment device may be provided with an introduction device for introducing an exhaust gas G2 including dust, odor and water vapor from the mixing device to a gas outlet of a bottommost cyclone 4A of the cement burning device.

18 Claims, 1 Drawing Sheet

(51) Int. Cl.
- *C04B 7/40* (2006.01)
- *C04B 7/42* (2006.01)
- *C04B 7/44* (2006.01)
- *C10L 5/46* (2006.01)
- *F26B 17/20* (2006.01)
- *F27B 7/32* (2006.01)
- *C02F 11/00* (2006.01)

(52) U.S. Cl.
CPC ............ *C04B 7/428* (2013.01); *C04B 7/4423* (2013.01); *C04B 7/4438* (2013.01); *C10L 5/46* (2013.01); *F26B 17/20* (2013.01); *F27B 7/32* (2013.01); *C02F 2303/02* (2013.01); *C02F 2303/10* (2013.01); *C04B 2290/20* (2013.01); *C10L 2290/08* (2013.01); *C10L 2290/141* (2013.01); *C10L 2290/24* (2013.01)

(58) Field of Classification Search
CPC ....... C02F 2103/12; C04B 7/40; C04B 7/428; C04B 7/4423; C04B 7/4438; C04B 2290/20; C04B 7/4446; C04B 7/4407; C10L 5/46; C10L 2290/08; C10L 2290/141; C10L 2290/24; C10L 9/10; C10L 2290/02; C10L 2290/06; F26B 17/20; F26B 11/16; F27B 7/32; F27B 7/3205; Y02W 10/30; Y02W 10/40; Y02E 50/10; Y02E 50/30
USPC ..... 106/697; 366/1, 64; 210/173, 175, 512.2
See application file for complete search history.

(56) References Cited

FOREIGN PATENT DOCUMENTS

| JP | 57056096 A | 4/1982 |
|----|------------|--------|
| JP | 63025250 A | 2/1988 |
| JP | 01203813 A | 8/1989 |
| JP | 01208610 A | 8/1989 |
| JP | 06257731 A | 9/1994 |
| JP | 2006342046 A | 12/2006 |
| JP | 2007-277048 A * | 10/2007 |
| JP | 2008-279344 A * | 3/2008 |
| JP | 2008114173 A | 5/2008 |
| JP | 2009095804 A | 5/2009 |
| JP | 2015066477 A | 4/2015 |
| JP | 2016098130 A | 5/2016 |
| WO | 2014024498 A1 | 2/2014 |

* cited by examiner

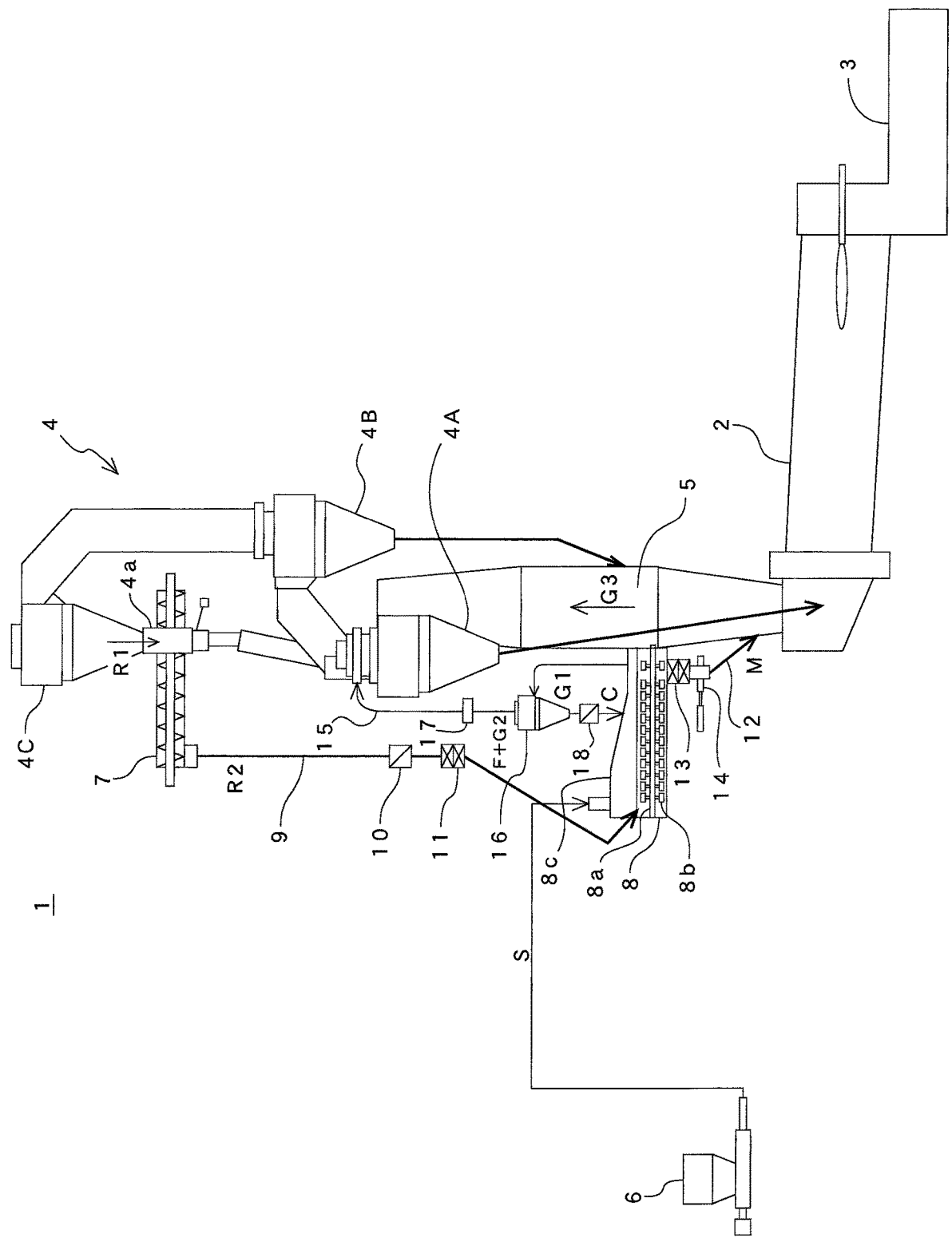

ORGANIC SLUDGE TREATMENT DEVICE AND TREATMENT METHOD

CROSS-REFERENCE TO RELATED APPLICATIONS

The present application claims priority to International Application No. PCT/JP2019/010030 filed of Mar. 12, 2019 and International Application No. PCT/JP2018/014386 filed on Apr. 4, 2018, the disclosures of which are incorporated herein by reference.

STATEMENT RE: FEDERALLY SPONSORED RESEARCH/DEVELOPMENT

Not Applicable

BACKGROUND

1. Technical Field of the Invention

The present invention relates to a treatment device and a treatment method for organic sludge such as sewage sludge, and more particularly to a device and so on for effectively utilizing organic sludge as fuel and the like.

2. Description of the Related Art

In recent years, it has been difficult to perform conventional landfill treatment of organic sludge such as sewage sludge discharged from sewage treatment plants in view of depletion of landfill and prevention of environmental pollution. Then, various methods of effectively utilizing sewage sludge and the like as fuel have been proposed. For example, in the patent document 1 and others is disclosed a technique for directly introducing an organic sludge, such as a sewage sludge as a slurry including water as it is, to a kiln inlet portion of a kiln or a calciner furnace of a cement producing facility to convert the sludge into fuel.

On the other hand, in the patent document 2 is disclosed a technique of mixing a sewage sludge and a quicklime to dehydrate the sewage sludge, and introducing a solid content generated to a cement kiln together with a cement raw material to convert it into cement. In addition, in the patent documents 3 and 4 is disclosed a technique of drying a sewage sludge with quicklimes in a preheater bottom material and a bypass dust.

However, in the technique described in the patent document 1, an organic sludge as a slurry including water as it is directly introduced to a portion of a cement kiln where a cement raw material is decarbonated (from a kiln inlet to a bottommost cyclone inlet). Then, there is a problem that heat quantity for evaporating sludge moisture is large; place and time that the moisture evaporates are not constant; and cement production efficiently decreases due to changing of exhaust gas amount or rapid decrease in burning temperature.

In addition, as described in the patent document 2, the sludge can be dried with reaction heat of quicklime, but quicklime is expensive, and a method of drying the sludge with heat generated after quicklime is hydrated requires long drying time.

As described in the patent documents 3 and 4, drying a sludge with hydration heat of quicklime included in a cement raw material suppresses cost in comparison to using marketed quicklime, but dried sludge must be dewatered again to utilize as a cement raw material, and heat loss generated by the dewatering becomes 1.5-2 times as much as theoretical value of heat quantity generated by the hydration, so that the heat loss is large.

Then, for example, in the patent document 5 and the like is disclosed a technique of drying organic sludge by a flash dryer as a pretreatment for introducing organic sludge to a kiln inlet of a cement kiln. In the technique, circulating dried powders, which are dried with air flow, are mixed to a sludge cake to adjust moisture thereof; mixed powders are crushed with a crusher of the flash dryer and are dried in a drying duct; dried powders are obtained by collecting dusts with a cyclone; and a predetermined amount of the dried powders is blown to a rotary kiln to utilize them as a part of a fuel for cement clinker burning.

Patent Document 1: Japan Patent No. 3933194 gazette
Patent Document 2: Japan Patent No. 2803855 gazette
Patent Document 3: Japan Patent No. 4106449 gazette
Patent Document 4: Japanese Patent publication No. 2015-66477 gazette
Patent Document 5: Japanese Patent publication No. 2002-273492 gazette

BRIEF SUMMARY

However, in the technique described in the patent document 5, facility cost increases since the flash dryer and so on are required, and when an exhaust gas of the flash dryer is returned to a cement burning device to perform odor treatment of the gas, cement production efficiency and clinker production amount decrease.

Then, the present invention has been made in consideration of the problems in the prior art, and the object thereof is to treat organic sludge while minimizing facility costs, cement production efficiency (energy conservation) and reduction in clinker production amount.

In order to attain the above object, the present invention relates to an organic sludge treatment device, and the device is characterized by including: a fractionation device for fractionating a preheated raw material from a preheater cyclone excluding a bottommost cyclone of a cement burning device; a mixing device for mixing an organic sludge with the preheated raw material fractionated by the fractionation device, and drying the organic sludge using sensible heat of the preheated raw material; and a supply device for supplying a mixture from the mixing device to a calciner furnace of the cement burning device or to a duct disposed between a kiln inlet portion of a cement kiln and the calciner furnace.

Here, the reason why the bottommost cyclone is excluded is that in the bottommost cyclone is decarbonated 95% of limestone contained in a raw material to be CaO, although it becomes a heat source for drying when reacted with water, heat loss is large and it takes cost, so that there is no difference in energy cost in comparison to direct feeding of organic sludge.

With the present invention, mixed with a preheated raw material from a preheater cyclone, an organic sludge is dried with sensible heat of the preheated raw material, and supplied together with the preheated raw material to a calciner furnace of the cement burning device or to a duct disposed between a kiln inlet portion of a cement kiln and the calciner furnace, dried sludge can effectively be utilized as an alternative fuel, and the heat source efficiently contributes to heat for decarbonation of cement raw material in the calciner furnace and so on, which allows an organic sludge to be treated while minimizing facility costs, cement production efficiency and reduction in clinker production amount. In addition, without preheating with exhaust gas, facility construction is simple and compact, which enables space saving.

The above organic sludge treatment device may further include an introduction device for introducing an exhaust gas including dust, odor and water vapor from the mixing device to a gas outlet of a bottommost cyclone of the cement burning device. With this, odor gas generated by drying organic sludge can be treated while effectively utilizing the gas for denitrating cement kiln exhaust gas. In addition, when the exhaust gas is returned to a calciner furnace or a cement kiln, it becomes heat loss at pre-calcination, but in this invention, since the gas is returned to a gas outlet of a bottommost cyclone (exhaust gas after decarbonation reaction is finished), heat loss becomes minimum.

The above organic sludge treatment device may further include a cyclone dust collector to which the exhaust gas including dust, odor and water vapor is introduced from the mixing device, and which recovers coarse powder (collected dust) and returns the recovered coarse powder to the mixing device and discharges an exhaust gas including fine powder (dust that is not collected), odor and water vapor. With this, a coarse powder is collected to use the drying again, and the odor gas can be treated while effectively utilizing for denitrating cement kiln exhaust gas, and so on.

The organic sludge treatment device may further include a urea supply device for supplying particulate urea, which is not an aqueous solution, to the mixing device. Decomposing the supplied urea with the fractionated preheated raw material and adding it to a gas outlet of a bottommost cyclone together with odor and water vapor contained in an organic sludge facilitates diffusion of ammonia into a gas without a special spray nozzle to enhance denitration function. Further, since particulate urea, which is not an aqueous solution, is added, in comparison to a conventional method of adding urea water, water quantity introduced in a cement burning apparatus can be reduced, which suppresses reduction in cement production.

In the above organic sludge treatment device, temperature of a mixture from an outlet of the mixing device may be 120° C. or more, which prevents troubles due to condensation of moisture at transportation.

Further, the present invention relates to an organic sludge treatment method, and the method characterized by including the steps of: mixing an organic sludge with a preheated raw material that is fractionated from a preheater cyclone excluding a bottommost cyclone of a cement burning device; drying the organic sludge with sensible heat of the preheated raw material; and supplying a mixture of the organic sludge and the preheated raw material to a calciner furnace of the cement burning device or to a duct disposed between a kiln inlet portion of a cement kiln and the calciner furnace.

With the present invention, drying an organic sludge with sensible heat of a preheated raw material, which is fractionated from a preheater cyclone excluding a bottommost cyclone, and feeding a dried sludge into a calciner furnace and others together with the preheated raw material allow the dried sludge to effectively be utilized as an alternative fuel, and the heat source efficiently contributes to heat for decarbonation of cement raw material in the calciner furnace and so on, which allows an organic sludge to be treated while minimizing facility costs, cement production efficiency and reduction in clinker production amount.

In the above organic sludge treatment method, an odor gas generated when the organic sludge and the fractionated preheated raw material are mixed can be introduced to a gas outlet of a bottommost cyclone of the cement burning device, and thereby an organic sludge can be treated while effectively utilizing ammonia, generated at drying of the sludge, contained in the odor gas for denitrating cement kiln exhaust gas.

In addition, temperature of the preheated raw material fractionated from the preheater cyclone may be 400° C. or more and 820° C. or less.

Further, mixing ratio of the organic sludge and the fractionated preheated raw material may be set to be the organic sludge (solid content whose moisture is removed): the fractionated preheated raw material=1:3-1:40. With this, moisture can stably be vaporized for a short time. Moreover, diluting combustibles of an organic sludge with a fractionated preheated raw material as a noncombustible solves apprehension of dust explosion. Still further, the above mixing ratio remarkably improves handleability of an organic sludge with high viscosity.

Setting calcium oxide (CaO) content of the preheated raw material less or equal to 20 mass % avoids difficult control and large heat loss.

As described above, with the present invention, it becomes possible to safely treat organic sludge while minimizing facility costs, cement production efficiently and reduction in clinker production amount.

BRIEF DESCRIPTION OF THE DRAWINGS

FIG. 1 is a schematic view showing a cement burning device according to an embodiment of the present invention.

DETAILED DESCRIPTION

Next, an embodiment of the present invention will be explained with referenced to the drawing in detail.

FIG. 1 shows a cement burning device with an organic sludge treatment device according to the present invention, and the cement burning device 1 is, in addition to components of a common cement burning device such as a cement kiln 2, a clinker cooler 3, a preheater 4 and a calciner furnace 5, provided with: a fractionation device 7 for fractionating a part of a cement raw material R1 discharged from a raw material chute 4a of the third cyclone 4C of the preheater 4; a mixing device 8 for mixing the fractionated preheated raw material R2 with an organic sludge S supplied from an organic sludge supply device 6 to dry the organic sludge S; and so on. Although the preheater 4 includes four or five stage cyclones, illustration of devices above the third cyclone 4C is omitted in FIG. 1. The organic sludge S is sewage sludge, papermaking sludge, building pit sludge, food sludge, and so on.

The fractionation device 7 may include a screw conveyer penetrating the raw material chute 4a of the third cyclone 4C. An upper half of a casing of a part of the screw conveyer penetrating the raw material chute 4a is removed, and to the screw conveyer is introduced the cement raw material R1 from above. To a raw material chute 9 between the fractionation device 7 and the mixing device 8 are mounted a flap damper 10 and a double-flap damper 11, which introduce the preheated raw material R2 fractionated while keeping airtightness to the mixing device 8.

The mixing device 8, such as a pug mill, includes a horizontal shaft 8a with a plenty of blades 8b, and rotating the horizontal shaft 8a allows the blades 8b to rotate also. The mixing device 8 simultaneously performs mixing, drying and conveying of the organic sludge S and the fractionated preheated raw material R2. The mixing device 8 is provided with a hood 8c for preventing scattered dust from increasing due to sudden generation of water vapor.

Above the mixing device 8 is disposed a cyclone dust collector 16 for removing dust from an exhaust gas G1 of the mixing device 8, and to a gas duct 15 above the cyclone dust collector 16 is mounted a flow rate adjustment valve 17 for adjusting flow rate of an exhaust gas G2 of the cyclone dust collector 16. To a chute of the cyclone dust collector 16 is mounted a flap damper 18, which returns a coarse powder C collected while keeping airtightness to the mixing device 8.

Below the mixing device 8 disposed a double-flap damper 13 and a shut damper 14, which introduce a mixture M of the preheated raw material R2 and the organic sludge S through a mixture chute 12 to a lower portion of the calciner furnace 5 while keeping airtightness.

Next, an organic sludge treatment method according to the present invention using the cement burning device 1 with the above structure will be explained with reference to FIG. 1.

When the cement burning device 1 operates, the organic sludge S is supplied through the organic sludge supply device 6 to the mixing device 8, and a part of the cement raw material R1 discharged from the third cyclone 4C of the preheater 4 is fractionated with the fractionation device 7, and the fractionated preheated raw material R2 is introduced to the mixing device 8. Amount of the preheated raw material R2 fractionated can instantly be controlled by changing rotation speed of the screw conveyer of the fractionation device 7. With this, it becomes possible to correspond to change in supply amount of the organic sludge S due to property variations (viscosity variation, seasonal variation, moisture variation) by instantly controlling the amount of preheated raw material R2 fractionated, which enables stable treatment of the sludge.

In addition, based on phosphorus pentoxide (P2O5) content, which characterizes sewage sludge, the amount of preheated raw material R2 fractionated can be controlled. P2O5 is contained in the cement raw material R1 by about 0.04%, and is contained in a sewage sludge by about 3-8%. Then, P2O5 content of the mixture (dried sludge) M is measured by an online fluorescence X-ray device, and the amount of the preheated raw material R2 or the organic sludge S is controlled depending on the measured P2O5 content (for example, mixing ratio is controlled to obtain a P2O5 content that is calculated based on a prescribed mixing ratio, concretely when measurement value of P2O5 content is low, amount of the preheated raw material R2 fractionated is decreased, or amount of the organic sludge S is increased), which enables drying in an optimum ratio. With this, composition of the mixture M supplied to the cement kiln 2 can be constant, which makes adverse effect on the cement kiln 2 small.

Here, mixing ratio of the organic sludge S and the fractionated preheated raw material R2 is preferably controlled to be the organic sludge S (solid content whose moisture is removed): the fractionated preheated raw material R2=1:3-1:40, more preferably the organic sludge S (solid content whose moisture is removed): the fractionated preheated raw material R2=1:7-1:30, further preferably the organic sludge S (solid content whose moisture is removed): the fractionated preheated raw material R2=1:15-1:25, or preferably the organic sludge S (whose water content is 80%): the fractionated preheated raw material R2=1:0.6-1:8, more preferably the organic sludge S (whose water content is 80%): the fractionated preheated raw material R2=1:1-1:6, further preferably the organic sludge S (whose water content is 80%): the fractionated preheated raw material R2=1:3-1:5. Setting the quantity of the fractionated preheated raw material R2 to the quantity of the organic sludge S (solid content) more or equal to three times improves heat conductivity to stably evaporate moisture in a short period of time, and eliminates fear of dust explosion since combustibles of the organic sludge S are diluted with the fractionated preheated raw material R2 as a incombustible. Suppressing the quantity of the fractionated preheated raw material R2 to the quantity of the organic sludge S (solid content) less or equal to 40 times enables efficient treatment of the organic sludge S. In addition, the above range of mixing ratio remarkably improves handleability of the organic sludge S with high viscosity.

In the mixing device 8, the organic sludge S and the fractionated preheated raw material R2 are conveyed while being agitated for preferably 1-20 minutes, and more preferably for 1-10 minutes to heat and dry the organic sludge S with sensible heat of the fractionated preheated raw material R2. The raw material R1 that is not fractionated is further preheated in a second cyclone 4B as usual; decarbonated in the calciner furnace 5 and a bottommost cyclone 4A; and burnt in the cement kiln 2 to be cement clinker.

The mixture M of the dried organic sludge S and the fractionated preheated raw material R2, whose temperature is 120° C. or more, is discharged from the mixing device 8, and is introduced through the mixture chute 12 to a lower portion of the calciner furnace 5. Setting temperature of the mixture M at an outlet of the mixing device 8 to be 120° C. or more prevents trouble due to moisture condensation at transportation. In addition, temperature of the exhaust gas G1 discharged from the mixing device 8 is also controlled to be 120° C. or more. The dried organic sludge S of the mixture M is utilized in the calciner furnace 5 as an alternative fuel, and the fractionated preheated raw material R2 of the mixture M is decarbonated in the calciner furnace 5 and the bottommost cyclone 4A, and is burnt in the cement kiln 2 to be cement clinker.

On the other hand, the exhaust gas G1 of the mixing device 8 is introduced to the cyclone dust collector 16, a coarse powder (collected dust) C is returned to the mixing device 8. When flow rate of the exhaust gas G2 including a fine powder (which is not collected) F, odor and water vapor from the cyclone dust collector 16 is properly controlled by the flow rate adjustment valve 17, and the exhaust gas G2 is introduced to an exhaust gas outlet of the bottommost cyclone 4A, thereby the odor included in the exhaust gas G2 is removed, and ammonia originated from the organic sludge S of the exhaust gas G2 denitrates a cement kiln exhaust gas G3. In addition, returning the exhaust gas G2 to the calciner furnace 5 or the cement kiln 2 generates heat loss in calcination, but in the present invention returning the gas G2 to a gas outlet portion of the bottommost cyclone 4A minimizes heat loss. In case that amount of dust included in the exhaust gas G1 is small due to effect of the hood 8c, the cyclone dust collector 16 and the flap damper 18 can be omitted.

As described above, in the present embodiment, adopting the mixing device 8, which is simple in structure and compact in comparison to flash dryers, suppresses facility costs and realizes space saving. In addition, introducing the exhaust gas G2, which includes a fine powder F, odor and water vapor, of the mixing device 8 to the exhaust gas outlet of the bottommost cyclone 4A does not exert adverse effect on decarbonation and the like of the cement raw material R1 in the calciner furnace 5.

In addition, adding urea in the mixing device 8 allows ammonia concentration contained in the exhaust gas G1 of the mixing device 8 (the exhaust gas G2 of the cyclone dust collector 16) to be increased, resulting in further increased denitration function of the cement kiln exhaust gas G3. Urea is usually added to the calciner furnace 5 or a kiln inlet portion as water solution, but in the present invention, urea can be added in the mixing device 8 as particles as they are, thereby denitration effect can be expected without heat loss.

Although in the above embodiment is fractionated the preheated raw material R2 from the raw material chute 4a of the third cyclone 4C of the preheater 4, temperature of the preheated raw material R2 is approximately preferably 400-820° C., more preferably 500-800° C., further preferably from the view point of efficient heat exchange with the organic sludge S.

In the present invention, calcium oxide (CaO) content of the fractionated preheated raw material R2 is preferably 20 mass % or less, more preferably 15 mass % or less, further preferably 10 mass % or less, still further preferably 5 mass %, yet further preferably 3 mass %. When calcium oxide (CaO) in the fractionated preheated raw material R2 is too much, contacting the preheated raw material R2 of high temperature to water content of the organic sludge S in the mixing device 8 may cause exothermic reaction, that is, $CaO+2H_2O \rightarrow Ca(OH)_2$. In this case, control becomes difficult, and heat loss becomes large as described above.

In addition, construction of the mixing device 8 is not limited to the above, and as long as the organic sludge S can be dried with sensible heat of the fractionated preheated raw material R2, other kinds of device may be adopted.

Next, an operation example of the cement burning device 1 will be explained.

An organic sludge S whose water content is about 80% was supplied from the organic sludge supply device 6 to the mixing device 8 with a hood (6250 mm in length, 1534 mm in width, 3000 mm in height) by 4-7 t/h, and a preheated raw material R2 whose temperature is about 650° C. (CaO content is less or equal to 3 mass %) was fractionated with the fractionation device 7 from the third cyclone 4C of the preheater 4 of the cement burning device 1 by 15-22 t/h, and was supplied through the flap damper 10 and the double-flap damper 11 to the mixing device 8. The organic sludge S and the fractionated preheated raw material R2 were mixed with each other in the mixing device 8 (at the mixing ratio of the organic sludge S (water content is 80%) and the fractionated preheated raw material R2, S:R2=1:3-1:5), and the organic sludge S was dried with sensible heat of the fractionated preheated raw material R2. Mixing time of the fractionated preheated raw material R2 and the organic sludge S was 1-3 minutes.

Due to the mixing and drying in the mixing device 8, from the mixing device 8 with a hood, 4,000-7,000 Nm3/h of exhaust gas G1 (dried water vapor), whose temperature was about 300° C., was discharged, and fed through the cyclone dust collector 16 and the flow rate adjustment valve 17 to an outlet gas duct of the bottommost cyclone 4A. On the other hand, from the mixing device 8, 16-24 t/h of a mixture (dried sludge) M, whose water content is less or equal to 1% and whose temperature is 120° C.-200° C., was discharged and fed through the double-flap damper 13 and the shut damper 14 to the cement kiln 2. The mixture M, which had evenly mixed, was a powder without a large mass and was favorable in handleability, so that they didn't cause clogging in a transporting system. As a result, there was no adverse effect on a cement manufacturing process, and production quantity of clinker was also maintained.

DESCRIPTION OF THE REFERENCE NUMERALS 1 cement burning device
2 cement kiln
3 clinker cooler
4 preheater
4A bottommost cyclone
4B second cyclone
4C third cyclone
4a raw material chute
5 calciner furnace
6 organic sludge supply device
7 fractionation device
8 mixing device
8a horizontal shaft
8b blades
8c hood
9 raw material chute
10 flap damper
11 double-flap damper
12 mixture chute
13 double-flap damper
14 shut damper
15 gas duct
16 cyclone dust collector
17 flow rate adjustment valve
18 flap damper
C coarse powder
F fine powder
G1-G3 exhaust gases
M mixture
R1 cement raw material
R2 preheated raw material
S organic sludge

The invention claimed is:

1. An organic sludge treatment device comprising:
   a fractionation device for fractionating a preheated raw material from a preheater cyclone excluding a bottommost cyclone of a cement burning device, the preheated raw material fractioned from the preheater cyclone having a calcium oxide (CaO) content of less than or equal to 20 mass %;
   a mixing device for mixing an organic sludge with the preheated raw material fractionated by the fractionation device, and drying the organic sludge with sensible heat of the preheated raw material; and
   a supply device for supplying a mixture from the mixing device to a calciner furnace of the cement burning device or to a duct disposed between a kiln inlet portion of a cement kiln and the calciner furnace.

2. The organic sludge treatment device as claimed in claim 1, further comprising an introduction device for introducing an exhaust gas including dust, odor and water vapor from the mixing device to a gas outlet of the bottommost cyclone of the cement burning device.

3. The organic sludge treatment device as claimed in claim 2, further comprising a cyclone dust collector to which the exhaust gas including dust, odor and water vapor is introduced from the mixing device, and which recovers coarse powder and returns the recovered coarse powder to the mixing device and discharges an exhaust gas including fine powder, odor and water vapor to the introduction device, the coarse powder being of a larger size than the fine powder.

4. The organic sludge treatment device as claimed in claim 3, further comprising a urea supply device for supplying particulate urea to the mixing device.

5. The organic sludge treatment device as claimed in claim 3, wherein temperature of a mixture from an outlet of the mixing device is 120° C. or more.

6. The organic sludge treatment device as claimed in claim 2, further comprising a urea supply device for supplying particulate urea to the mixing device.

7. The organic sludge treatment device as claimed in claim 2, wherein temperature of a mixture from an outlet of the mixing device is 120° C. or more.

8. The organic sludge treatment device as claimed in claim 1, further comprising a urea supply device for supplying particulate urea to the mixing device.

9. The organic sludge treatment device as claimed in claim 8, wherein temperature of a mixture from an outlet of the mixing device is 120° C. or more.

10. The organic sludge treatment device as claimed in claim 1, wherein temperature of a mixture from an outlet of the mixing device is 120° C. or more.

11. An organic sludge treatment method comprising the steps of: mixing an organic sludge with a preheated raw material that is fractionated from a preheater cyclone excluding a bottommost cyclone of a cement burning device, wherein a calcium oxide (CaO) content of the preheated raw material fractionated from a preheater cyclone is less or equal to 20 mass %; drying the organic sludge with sensible heat of the preheated raw material; and supplying a mixture of the organic sludge and the preheated raw material to a calciner furnace of the cement burning device or to a duct disposed between a kiln inlet portion of a cement kiln and the calciner furnace.

12. The organic sludge treatment method as claimed in claim 11, further comprising the step of introducing an odor gas generated when the organic sludge and the preheated raw material fractionated from a preheater cyclone are mixed to a gas outlet of the bottommost cyclone of the cement burning device.

13. The organic sludge treatment method as claimed in claim 12, wherein temperature of the preheated raw material fractionated from the preheater cyclone is 400° C. or more and 820° C. or less.

14. The organic sludge treatment method as claimed in claim 12, wherein mixing ratio of the fractionated preheated raw material to the organic sludge is set to 3 to 40 times.

15. The organic sludge treatment method as claimed in claim 11, wherein temperature of the preheated raw material fractionated from the preheater cyclone is 400° C. or more and 820° C. or less.

16. The organic sludge treatment method as claimed in claim 15, wherein mixing ratio of the fractionated preheated raw material to the organic sludge is set to 3 to 40 times.

17. The organic sludge treatment method as claimed in claim 11, wherein mixing ratio of the fractionated preheated raw material to the organic sludge is set to 3 to 40 times.

18. An organic sludge treatment device comprising:
a fractionation device for fractionating a preheated raw material from a preheater cyclone excluding a bottommost cyclone of a cement burning device;
a mixing device for mixing an organic sludge with the preheated raw material fractionated by the fractionation device, and drying the organic sludge with sensible heat of the preheated raw material;
a supply device for supplying a mixture from the mixing device to a calciner furnace of the cement burning device or to a duct disposed between a kiln inlet portion of a cement kiln and the calciner furnace; and
an introduction device for introducing an exhaust gas including dust, odor and water vapor from the mixing device to a gas outlet of a bottommost cyclone of the cement burning device.

* * * * *